United States Patent [19]

Domigan

[11] Patent Number: 4,879,435
[45] Date of Patent: Nov. 7, 1989

[54] FITTING FOR THE UNDERSIDE OF A CELLULAR FLOOR

[75] Inventor: Charles N. Domigan, Coolville, Ohio

[73] Assignee: Butler Manufacturing Company, Kansas City, Mo.

[21] Appl. No.: 230,035

[22] Filed: Aug. 9, 1988

[51] Int. Cl.$^4$ .............................................. H02G 3/22
[52] U.S. Cl. ..................................................... 174/48
[58] Field of Search ............................. 174/48; 52/221

[56] References Cited

U.S. PATENT DOCUMENTS

| | | | |
|---|---|---|---|
| 4,041,238 | 8/1977 | Penczak | 174/48 |
| 4,099,020 | 7/1978 | Kohaut | 174/48 |
| 4,554,771 | 11/1985 | Marwah et al. | 174/48 X |
| 4,572,923 | 2/1986 | Castellani et al. | 174/48 |

Primary Examiner—Arthur T. Grimley
Assistant Examiner—David A. Tone
Attorney, Agent, or Firm—Frederick J. Olsson

[57] ABSTRACT

A fitting mounted on the bottom of a cell in a cellular raceway. A hollow cylindrical member engages and is secured to the bottom of the cell in alignment with a bore in the bottom. A junction box is mounted on the lower end of the cylindrical member and has an opening aligned with the member. Intumescent wafers are inside of the cylindrical member and are formed to permit passage of conductors. Discs restrain the intumescent wafers from expanding into the cell and junction box. Electrical conductors can extend from the junction box to the cell.

10 Claims, 1 Drawing Sheet

FITTING FOR THE UNDERSIDE OF A CELLULAR FLOOR

This invention relates to electrical distribution systems in electrified decking which is wholly or partially comprised of cellular raceways having high and low tension cells.

More particularly the invention relates to electrically interfacing the high and low tension cells of a cellular raceway and the high and low tension wiring systems in the space between the floor and the drop ceiling below.

The high and low tension cells of a cellular raceway in a floor are normally fed via a riser connected to independent high and low tension panels mounted above the floor either on a wall or on a column.

In the wiring space between the floor and drop ceiling, the high and low tension wiring systems are normally fed from service boxes within the wiring space which are either column or wall mounted. These service boxes are in turn fed from wall or column mounted panels located below the ceiling. In other words, panels above the floor feed the cellular raceway and panels below the floor feed the wiring space.

It often occurs in wiring space systems that during the construction phase after the installation is underway or completed, it is necessary to provide additional high or low tension service in the wiring space. Moreover, after the building is completed and occupied, a change in tenancy or equipment may necessitate a change in high or low tension service. In either case, long runs may be required along with the removal and replacement of large numbers of ceiling panels. Also, in many instances the wiring space functions as an air plenum which is subject to environmental regulations requiring that all cables be enclosed in conduit or be coated with Teflon. Conduit installation or the use of especially coated cable is expensive both from the labor and material standpoints.

In contrast to the conventional way, the invention contemplates the use of fittings which permit a high tension or low tension cell of an existing cellular raceway to be employed for running conductors to the desired area and then bringing these conductors out of the cell down into the wiring area for connection to provide the necessary service. Conversely, the fitting is used to bring conductors from the wiring space up into the cell.

For the above purposes, the invention contemplates that either the panel above the floor or below the floor in question be employed as the feeder.

When the panel above the floor is to be employed, the run from the panel goes down through the riser, through the high or low tension cell to the desired area and thence down into the wiring area. When the panel below the floor is to be employed, the run goes from the panel up into a fitting on the bottom of the cellular raceway, out through the cell to the desired area and thence down into the wiring space. The advantages of employing the panel below the cellular raceway is that in case the circuit breaker trips, the same is available for re-set right on the floor area rather than on the floor above.

Thus, for purposes as above described, the invention contemplates a fire-protected fitting which can be quickly mounted on the underside of a cell of a cellular raceway and provide a passageway for conductors as between the cell and the under-the-floor wiring space.

The fitting contemplates a smooth area where the cable exits or enters the cell to avoid fishing damage and a minimum projection into the cell so as to negligably affect cell capacity.

Figure 1:
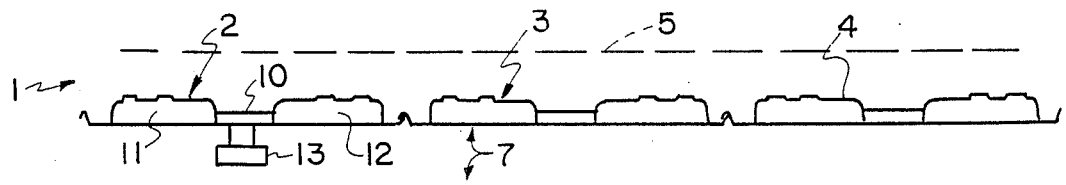
FIG. 1 is a view illustrating the invention as may be employed in a cellular floor comprised of all cellular raceways.

In FIG. 1 there is shown representation of a cellular floor 1 having an all cellular raceway underfloor comprised of identical modules 2, 3, and 4. The concrete portion of the floor is indicated at 5 and the drop ceiling by 6. The space between the bottom of the cellular floor and ceiling 6 is noted at 7.

The module 1 has a high tension cell 10 (carrying power cables or conductors), and low tension cells 11 and 12 (carrying telephone, data, computer, etc. cables). The fitting of the invention indicated at 13 is connected to the bottom of the high tension cell 10 and extends into the space 7.

Figure 2:
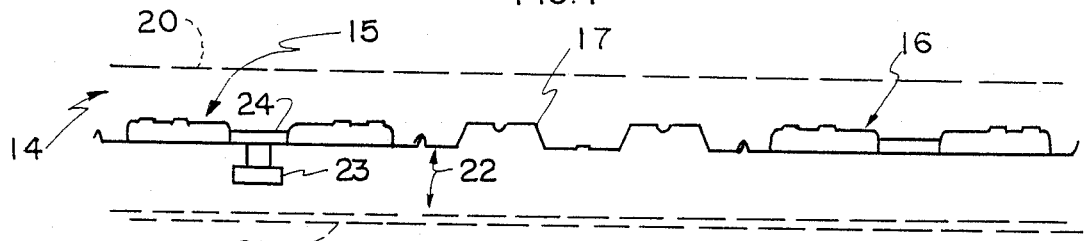
FIG. 2 is a view illustrating the invention as may be employed in a cellular floor comprised of both deck and cellular raceways.

In FIG. 2 there is a representation of cellular floor 14 having two cellular raceways 15 and 16 and an intermediate deck unit 17. The concrete portion of the floor is indicated at 20 and the drop ceiling at 21. The space between the bottom of the cellular floor 14 and the ceiling 21 is indicated at 22. The fitting 23 which is the same as the fitting 13 is connected to the bottom of the high tension cell 24.

With the above in mind, I will now describe a preferred embodiment of the invention.

Figure 3:
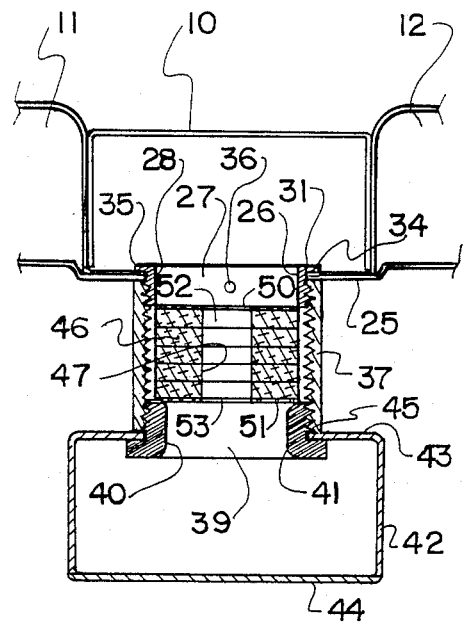
FIG. 3 is a sectional elevational view showing the invention connected to the power cell of a cellular raceway.
Figure 5:
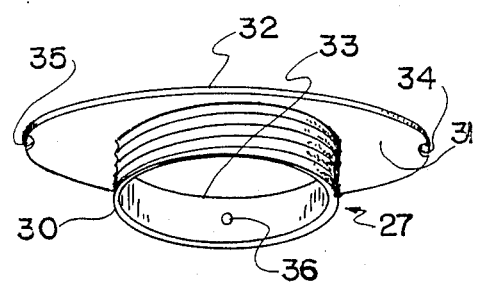
FIG. 5 is a perspective view of a securing means employed in the fitting.
Figure 6:
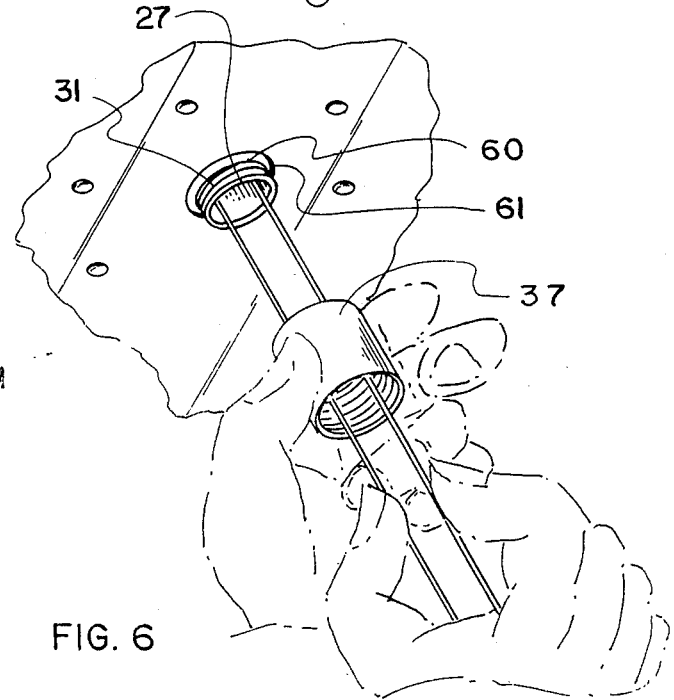
FIG. 6 is a view to illustrate the securing of the fitting to the bottom of a cellular raceway.

Referring to FIG. 3, the bottom 25 of high tension cell 10 has a bore 26. A mounting ring 27 extends through the bore 26. The structure of the mounting 27 is best seen in FIG. 5. The ring 27 has an opening 28 and is externally threaded as noted at 30 and has an elliptically-shaped flange 31. The diameter of the threads 30 is less than the diameter of bore 26.

The minor radii of the flange 31 are each less than the radius of the bore so that two diametrically opposed portions indicated at 32 and 33 provide that the width of the flange at those portions is less than the diameter of the bore 26 to permit the ring to be inserted through the bore.

The major radii of the flange 31 are each greater than the radius of the bore so that two other diametrically opposed portions indicated at 34 and 35 extend outwardly of the ring to an extent for engaging the inside of the bottom 25 as noted in FIG. 3.

On the inside of the mounting ring 27 are a pair of facing apertures one of which is indicated at 36. These apertures are for use in receiving the ends of an installation tool as will be noted shortly.

A hollow cylindrically-shaped nipple 37 is internally threaded and is joined to the mounting ring 27. The end of the nipple engages the outside of the bottom 25.

As will be evident, the area of the bottom 25 around the bore 26 is disposed between the top end of the nipple 37 and the flange portions 34 and 35. The nipple is threaded on the mounting ring so that the bottom is locked between the nipple and the flange. The bottom of the nipple 37 carries retaining nut 39 having an opening 40 aligned with opening 28. The nut is threaded into the nipple as shown. The nut has a retaining flange 41.

A junction box 42 has a top wall 43 and a bottom removable cover 44. The top wall has an opening 45. As will be observed, the retaining nut 41 fits into the opening 45. The area of the top wall 43 around the opening 45 is disposed between the lower end of the nipple 37 and the flange 41. The retaining nut 40 is turned up so that the top of the junction box is locked between the nut and nipple.

The junction box 42 may be provided with knockouts for couplings or wire retainers. With coupling-knockouts, the box is adapted for conduit type wiring in the space 7; i.e. a coupling secured in a knockout mounts EMT conduit. With wire retainer-knockouts, the junction box is adapted for a flexible wiring type system; i.e. wire retainers in the knockouts are adapted to receive plug-in cable heads.

As mentioned heretofore, the fitting is fire-protected. For this purpose the nipple mounts a plurality of stacked intumescent wafers 46 each of which has a center opening to form a opening 47 which is aligned with the opening 28, the bore 26, and opening 40.

On the top side and on the bottom side of the wafers are metal discs 50 and 51 which have openings 52 and 53 aligned with the above mentioned openings. The disc 50 is disposed between the mounting ring 27 and the top wafer and the disc 51 is disposed between the nut 40 and bottom wafer. The discs 50 and 51 maintain the wafers in the fitting.

The mounting ring 27, the nipple 37, the discs 50 and 51, the wafers 46, and the retaining nut 40 constitute a raceway for the passage of cable or conductors as between the cell 10 and the junction box 42.

Referring to the discs 50 and 51, the principal function of these components is to control the expansion of the intumescent material particularly in limiting upward and downward or axial expansion so as to insure that the material flows around the cables or conductors in the passage way and provides a seal which extends from the inner wall of the nipple inwardly and surrounds the cables or conductors.

In a device of the kind in question, it is important that intrusions into the cell be held to a minimum so not to adversely affect the cell capacity and that any intruding part be smooth or without sharp edges to avoid cable damages during fishing. Thus, referring to FIG. 3, is will be seen that the flange 31 is of minimum height and has a smooth contour. The same smooth condition is provided in the retaining nut 39. Also, it will be observed that the openings 52 and 53 in the discs 50 and 51 are of greater diameter than the opneings in the intumescent wafers. This avoids cable scraping by the discs.

Figure 4:
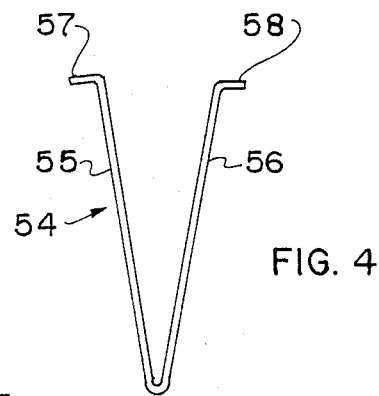
FIG. 4 is an elevational view of a tool employed in securing the fitting of the invention to the bottom of a cell.

In FIG. 4, I have shown a wire-form installation tool 54 having gripping arms 55 and 56 and feet 57 and 58. If the arms 55 and 56 are squeezed together, the feet 57 and 58 can be inserted into the tool apertures 36 in the mounting ring 27.

With the above in mind, I will now describe the manner in which the fitting is secured to the bottom of the cell 10.

Referring to FIG. 7, the bore 26 is drilled in the bottom of the cell 10. Next, the installation tool and the mounting ring are connected together by the feet 57 and 58 in the tool aperture. The mounting ring is tilted in the tool and the mounting ring and tool are moved upwardly in that the mounting ring goes through the bore 26. The mounting ring is then permitted to tilt back to normal position and the tool and mounting ring pulled downward so that the threaded section 31 extends down through the bore 26 and the portions 34 and 35 engage the inside of the bottom 25. Note the open spaces 60 and 61 between the bore 26 and the threaded section 31. This arises out of the configuration of the sections 32 and 33 on the mounting ring.

Now the nipple 37 is placed over the arms 55 and 56 moved upwardly, (while holding down on the tool) and threaded on the threads 30. The retaining ring 27 is kept from rotating by the tool. The nipple is threaded up tight against the bottom 25 of the cell 10 as previously described.

The disc 50 and wafers 46 are pushed up into the nipple The wafers are somewhat greater in diameter than the inside of the nipple so that they tend to be held by the threads.

With the cover 44 of the junction box removed, the disc 51 and junction box 42 are placed on top of the nut 39 and the assembly threaded up onto the nipple. After the installation of couplings or wire retainers and the fishing of conductors or cables, the cover is replaced. It will be understood, of course, that the conductor or cables can be fished prior to the installation of the fitting and in that case, the assembly is made in a manner to accomodate the conductors.

I claim:

1. In combination, a floor and a fitting:
the floor including a raceway cell having a bore formed in the bottom thereof;
the fitting including;
a hollow cylindrical member, one end of which engages the bottom of said cell in alignment with said bore;
a junction box having a top wall with an opening and a bottom with a removable cover, the junction box being spaced from the bottom of said cell and the other end of said cylindrical member engaging the top wall of the junction in alignment with the opening in the top wall;
means engaging the inside of the bottom of said cell and engaging the underside of the top wall of said junction box to secure said cylindrical member and the junction box to said cell; and
fire-retarding means located between said removable cover and the bottom of said cell and arranged to permit passage of conductors.

2. The combination of claim 1 wherein said means provides for a smooth entrance from the cell to the cylindrical member free from edges sharp enough to cut a conductor being fished between cell and cylindrical member.

3. The combination of claim 2 wherein said engagement with the inside of the bottom of said cell extends into the cell a distance to make a negligible effect on the conductor capacity of the cell.

4. In combination, a floor and a fitting:
the floor including a raceway cell having a bore formed in the bottom thereof;
the fitting including;

a hollow cylindrical member, one end of which engages the bottom of said cell in alignment with said bore;

a junction box having a top wall with an opening and a bottom with a removable cover, the junction box being spaced from the bottom of said cell and the other end of said cylindrical member engaging the top wall of the junction box in alignment with the opening in the top wall;

means engaging the inside of the bottom of said cell and engaging the underside of the top wall of said junction box to secure said cylindrical member and the junction box to said cell; and fire-retarding means disposed inside of said cylindrical member and having an opening to permit passage of conductors.

5. In combination, a floor and a fitting:
the floor including a raceway cell having a bore formed in the bottom thereof;
the fitting including;
a mounting ring, a portion of which is dimensioned to pass through said bore and a portion of which is dimensioned to and engages the inside of the bottom of said cell;
means on said mounting ring to be engaged by a tool to prevent the mounting ring from turning when being installed on said cell;
nipple means connected to said mounting ring and engaging the outside of the bottom of said cell;
intumescent means inside of said nipple means and having an opening; and
mechanism inside of said nipple to function when said intumescent means expands to restrain axial expansion of the material at least in a direction away from said cell.

6. In combination, a floor and a fitting:
the floor including a raceway cell having a bore formed in the bottom thereof;
the fitting including;
a hollow cylindrical nipple;
mounting means connecting said nipple to the bottom of said cell with the interior of the nipple in alignment with said bore;
said mounting means comprising a mounting ring, a portion of which is dimensioned to engage the inside of the bottom of said cell for use in installing the mounting ring on the bottom of the cell;
intumescent material in said nipple and having an opening aligned with said bore;
said nipple, said mounting means and said intumescent material providing a passageway for electrical conductors; and
said nipple and said mounting means providing for a smooth entrance from the cell to the passageway and providing that the interior of the cell adjacent said bore is free from edges sharp enough to cut a conductor being fished through the cell or the passageway.

7. In combination, a floor and a fitting:
the floor including a raceway cell having a bore formed in the bottom thereof;
the fitting including;
a mounting ring having an exteriorly threaded section the diameter of which is less than the diameter of said bore and an elliptically shaped flange on one end of the threaded section, the minor radii of the flange each being less than the radius of said bore and the major radii of the flange each being greater than the radius of said bore so that diametrically opposed first portions of the flange provide that the width of the flange at those portions permits passage of the flange through said bore for purposes of installing the ring on the bottom of said cell and so that the diametrically opposed second portions of the flange extend outwardly of the ring and engage the inside of the bottom of the cell;

on the inside of said mounting ring, a pair of apertures facing one another for use in receiving the ends of an installation tool;

a hollow cylindrically shaped nipple having internal threads, one end of the nipple being threaded on the exterior threads on said ring;

a first disc inside of said nipple and being adjacent to said mounting ring;

a retaining nut having external threads threaded into the threads on the opposite end of said nipple and having an outwardly extending securing flange;

a second disc inside of said nipple and being adjacent to said retaining nut;

a plurality of intumescent wafers inside of said nipple and disposed between said discs, each wafer having an opening, the openings being aligned with one another and with the openings in said first and second discs;

said mounting ring, said nipple, said first and second discs, said retaining nut, and said intumescent wafers constituting a raceway for the passage of electrical conductors; and said first and second discs being adapted, when said intumescent material expands, to restrain axial expansion of the material.

8. In combination, a floor and a fitting:
the floor including a raceway cell having a bore formed in the bottom thereof;
the fitting including;
a mounting ring having an exteriorly threaded section the diameter of which is the diameter of said bore, an elliptically shaped flange, the minor radii of the flange each being less than the radius of said bore and the major radii of the flange each being greater than the radius of said bore so that diametrically opposed first portions of the flange provide that the width of the flange at those portions permits passage of the flange through said bore for purposes of installing the ring on the bottom of said cell and so that diametrically opposed second portions of the flange extend outwardly of the ring for engaging the inside of the bottom of the cell;

on the inside of said mounting ring a pair of apertures facing one another for use in receiving the ends of an installation tool;

said ring extending through said bore and said second portions engaging the inside of the bottom of said cell;

a hollow cylindrically shaped nipple having internal threads, one end of the nipple being threaded on the exterior threads on said ring, and engaging the outside of the bottom of said cell whereby the portion of the bottom around said bore is squeezed between said flange and said nipple;

a junction box having a top wall with an opening, the area around the opening being engaged with the other end of said nipple;

a retaining nut having external threads threaded onto the threads on the opposite end of said nipple and having an outwardly extending flange engaging the inside of said top wall whereby the portion of the top wall around the opening is squeezed between the nipple and the retaining nut;
a first disc inside of said nipple and being adjacent to the other end of said mounting ring;
a second disc inside of said nipple and being adjacent to said retaining nut;
a plurality of intumescent wafers inside of said nipple and disposed between said discs, each wafer having an opening, the openings being aligned with one another and with the openings in said first and second discs;
said mounting ring, said nipple, said first and second discs, said retaining nut, and said intumescent wafers constituting a raceway for the passage of electrical conductors between said cell and said junction box; and
said first and second discs being adapted, when said intumescent wafers expand, to retrain axial expansion of the wafer material.

9. A fitting mounted on the bottom of a cell in a cellular raceway, the bottom having an opening and the fitting comprising:
a hollow cylindrical member having an upper end and a lower end, the upper end being secured to the bottom of the cell in alignment with said opening;
a junction box mounted on the lower end of said cylindrical member and having an opening in alignment with the interior of said cylindrical member;
intumescent material inside of said cylindrical member and having opening means;
restraint means inside of said cylindrical member to restrain axial expansion of said intumescent material into said opening in the junction box, the restraint means having opening means; and
the opening in the bottom of the cell, the hollow cylindrical member, the opening in the junction box, the opening means in the intumescent material, and the opening means in the restraint means constituting raceway means for passage of electrical conductors between the junction box and the cell.

10. A fitting mounted on the bottom of a cell in a cellular raceway, the bottom having an opening and the fitting comprising:
a hollow cylindrical member having an upper end and a lower end, the upper end being secured to the bottom of the cell in alignment with said opening;
a junction box mounted on the lower end of said cylindrical member and having an opening in alignment with the interior of said cylindrical member;
intumescent material inside of said cylindrical member and having opening means;
restraint means inside of said cylindrical member to restrain axial expansion of said intumescent material into said opening in said bottom of said cell and into said opening in the junction box, the restraint means having opening means; and
the opening in the bottom of the cell, the hollow cylindrical member, the opening in the junction box, the opening means in the intumescent material, and the opening means in the restraint means constituting raceway means for passage of electrical conductors between the junction box and the cell.

* * * * *